United States Patent
Greene

(10) Patent No.: US 7,686,119 B2
(45) Date of Patent: Mar. 30, 2010

(54) APPARATUS FOR REINFORCING SEATBELT USAGE IN AUTOMOBILES

(76) Inventor: Robert A. Greene, 5665 Vineyard Ln., Las Vegas, NV (US) 89110

( * ) Notice: Subject to any disclaimer, the term of this patent is extended or adjusted under 35 U.S.C. 154(b) by 0 days.

(21) Appl. No.: 11/452,703

(22) Filed: Jun. 13, 2006

(65) Prior Publication Data
US 2007/0285219 A1    Dec. 13, 2007

(51) Int. Cl.
*B60R 21/01* (2006.01)
(52) U.S. Cl. .................... 180/268; 340/457.1
(58) Field of Classification Search .......... 180/268, 180/269, 270, 271; 340/438, 457.1
See application file for complete search history.

(56) References Cited

U.S. PATENT DOCUMENTS

| | | | | |
|---|---|---|---|---|
| 3,770,919 | A * | 11/1973 | Lewis | 200/61.58 B |
| 3,863,209 | A * | 1/1975 | Hollins | 180/270 |
| 4,136,328 | A * | 1/1979 | Cambern | 180/268 |
| 4,319,658 | A * | 3/1982 | Collonia et al. | 180/271 |
| 4,633,687 | A * | 1/1987 | Fane | 70/276 |
| 5,404,128 | A * | 4/1995 | Ogino et al. | 340/425.5 |
| 5,689,421 | A * | 11/1997 | Gornig | 701/45 |
| 5,871,063 | A * | 2/1999 | Young | 180/268 |
| 6,078,252 | A * | 6/2000 | Kulczycki et al. | 340/425.5 |
| 6,250,672 | B1 * | 6/2001 | Ryan et al. | 280/735 |
| 6,260,650 | B1 * | 7/2001 | Gustavsson | 180/270 |
| 6,362,734 | B1 * | 3/2002 | McQuade et al. | 340/457.1 |
| 6,525,433 | B1 * | 2/2003 | Enoyoshi et al. | 307/10.5 |
| 6,601,669 | B1 * | 8/2003 | Agnew | 180/275 |
| 6,999,867 | B2 * | 2/2006 | Konno | 701/112 |
| 2002/0149469 | A1 * | 10/2002 | Thompson, Jr. | 340/5.61 |
| 2004/0119599 | A1 * | 6/2004 | Stevenson et al. | 340/686.1 |
| 2007/0096891 | A1 * | 5/2007 | Sheriff et al. | 340/457.1 |

* cited by examiner

*Primary Examiner*—Ruth Ilan
(74) *Attorney, Agent, or Firm*—Ariel S. Bentolila; Bay Area IP Group, LLC

(57) ABSTRACT

A technique for reinforcing seatbelt usage in automobiles is described. One implementation of which includes a weight sensor in the car seat that detects occupancy by a person and generates an occupancy signal that is transmitted to a seatbelt monitor unit that receives both the occupancy signal and a buckled seatbelt signal (based on a magnetic switch in the female portion of the buckle), and based thereupon, generates an unbuckled seatbelt alarm signal if the buckled seatbelt signal indicates that the buckle is not buckled when the transmitted occupancy signal indicates that the respective seat is occupied. A program executing on the automobile's stock computer then receives the unbuckled seatbelt alarm signal from the seatbelt monitor unit and handicaps the operation of the automobile in a predetermined way (e.g., speed limitation, engine kill, etc.).

14 Claims, 4 Drawing Sheets

APPARATUS FOR REINFORCING SEATBELT USAGE IN AUTOMOBILES

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark. Office, patent file or records, but otherwise reserves all copyright rights whatsoever.

FIELD OF THE INVENTION

The present invention relates generally to automobile safety equipment. More particularly, the invention relates to a system that increases seatbelt usage by confirming seatbelt connection of all persons in the automobile before allowing full operation of the automobile.

BACKGROUND OF THE INVENTION

Seatbelts are regarded by most people to be the best safety enhancement created within the field of transportation. Unfortunately, though, about 50 million Americans fail to use seatbelts at all. This directly leads to the death of almost 6,000 people on U.S. highways every year, which is about 16 every day, or two people every hour.

In view of the foregoing, there is a need for a system of ensuring proper seatbelt usage of drivers and passengers in automobiles.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 shows an exterior, top perspective view of the seatbelt.

FIG. 2 illustrates an internal, side transparent view of the seatbelt buckle showing a top and a bottom portion of the magnetic switch, and FIG. 3 illustrates an internal, side transparent view of the seatbelt buckle showing the lower portion of the magnetic switch.

Figure 1:
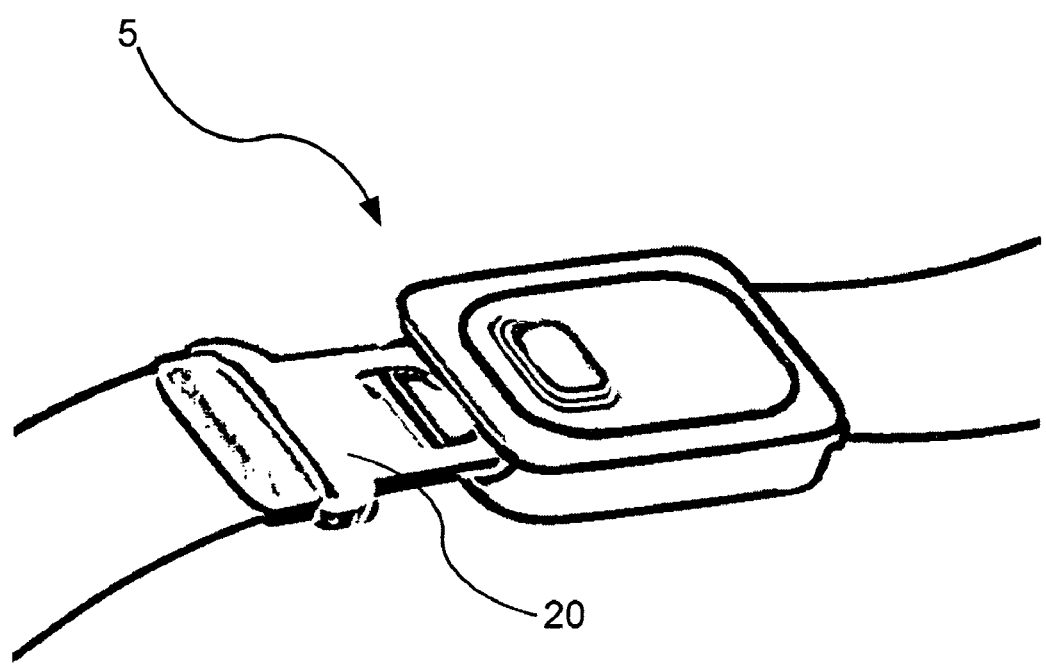
FIGS. 1, 2 and 3 are perspective views of an exemplary seatbelt buckle with an integrated magnetic switch, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, a variety of techniques for reinforcing seatbelt usage in automobiles are described.

A general implementation of the present invention, according to embodiment thereof, includes a weight sensor unit (e.g., a sensor pad in the car seat padding) that is used for sensing weight applied to an automobile seat and generating a corresponding weight reading when a person is secured onto the seat with the seatbelt system, and a sensor processing unit that receives the weight reading from the weight sensor and generates an occupancy signal that indicates the seat is occupied that is transmitted to a seatbelt monitor unit that receives both the transmitted occupancy signal and a buckled seatbelt signal (e.g., based on a magnetic switch in the female portion of the buckle), and based thereupon, generates an unbuckled seatbelt alarm signal if the buckled seatbelt signal indicates that the buckle is not buckled when the transmitted occupancy signal indicates that the respective seat is occupied. An automobile handicapping unit (e.g., a program executing on the automobile's stock computer) then receives the unbuckled seatbelt alarm signal from the seatbelt monitor unit and handicaps the operation of the automobile in a predetermined way (e.g., speed limitation, engine kill, etc.).

A multiplicity of alternate embodiments of the present invention may be configured by implementing the foregoing in any combination of the following in which: the weight sensor unit is a weight-sensor pad placed onto the surface of the seat where the person sits upon; and/or the weight reading is a binary signal indicating the presence or not of a certain amount of weight on the seat; and/or the weight reading is an analog signal and the sensor processing unit comprises electronics to threshold the analog signal to thereby generate a binary alert signal that indicates the presence or not of a certain amount of weight on the seat; and/or the alert signal transmission unit is a wireless transmitter system comprised of a radio transmitter and an antenna, and in which the seatbelt monitor comprises a corresponding radio receiver configured to properly receive and decode the wirelessly transmitted alert signal; and/or the alert signal transmission unit is a wired transmitter system, and in which the seatbelt monitor comprise a corresponding wired receiver configured to properly receive and decode the transmitted alert signal.

In other embodiments of the present invention, Steps for and means for achieving any combination of the foregoing functions are also described.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

One aspect of the present invention is to encourage all persons in an automobile to fasten their seatbelts by limiting the speed of the automobile to a certain handicapped speed (e.g., 10 miles-per-hour) without confirmed seatbelt connection of every person in the automobile. In some embodiments, this function is performed by common automobile equipment. Such low-speed limitation may protect unbelted drivers and passengers from serious injury and fatality should an accident occur.

Figure 2:
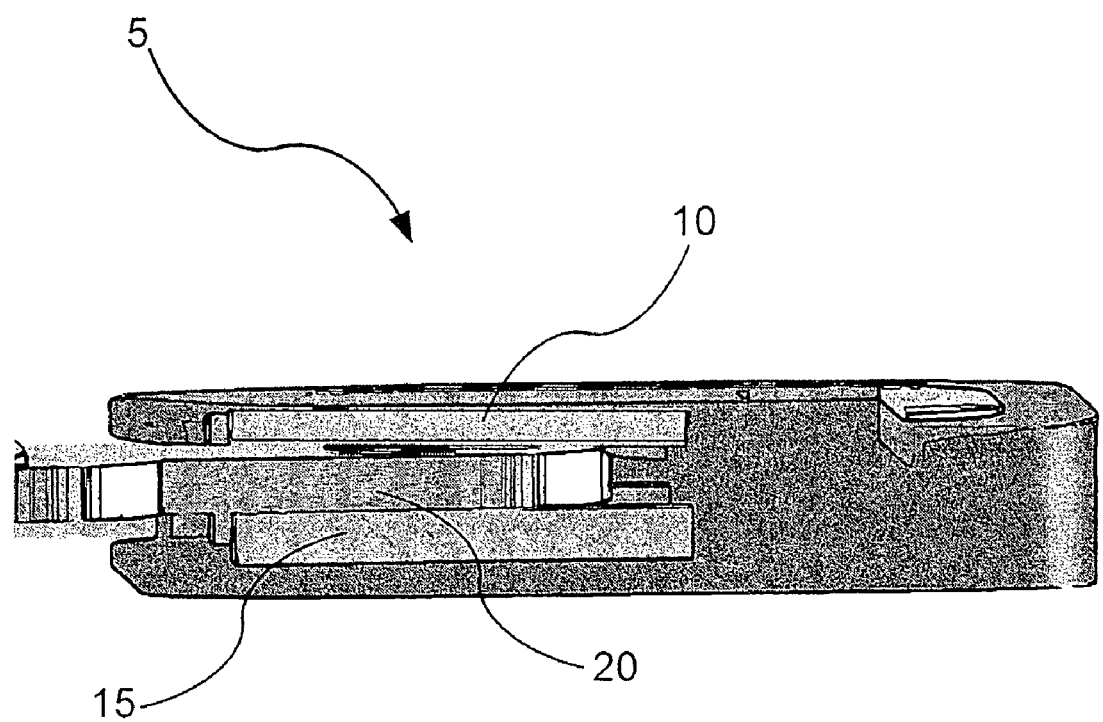
Figure 3:
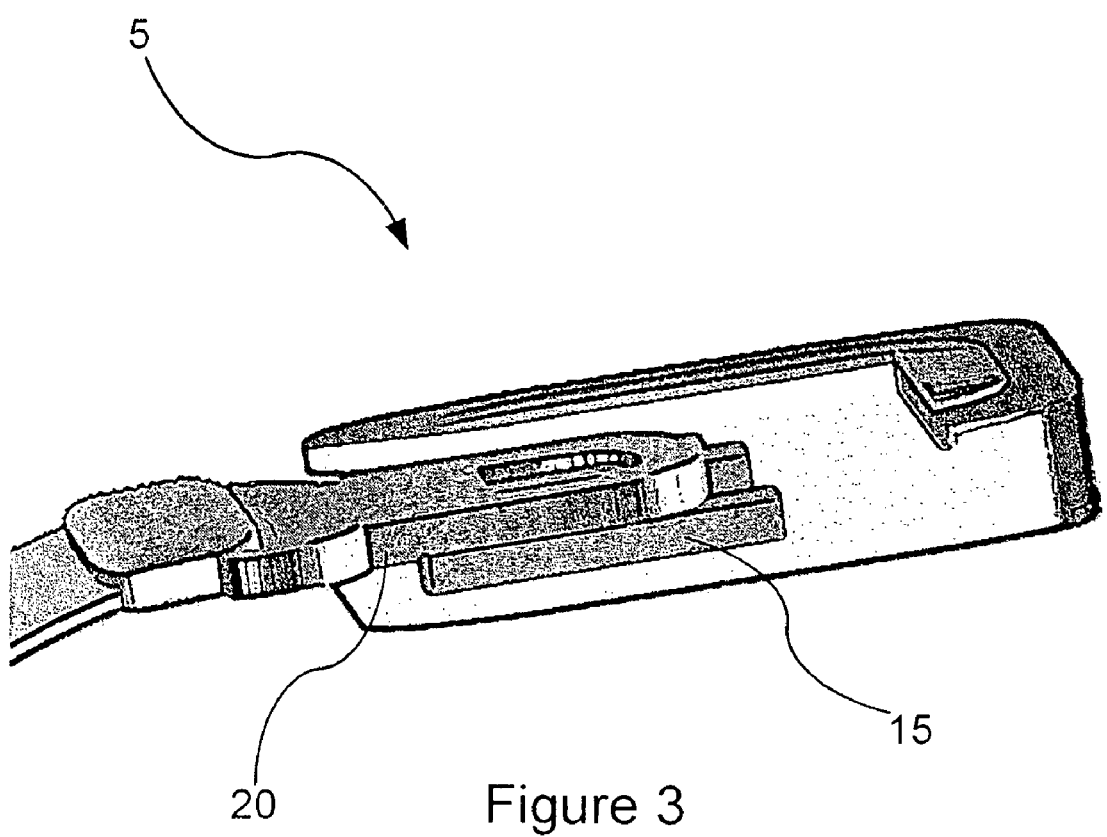

FIGS. 1, 2 and 3 are perspective views of an exemplary seatbelt buckle 5 with an integrated magnetic switch, in accordance with an embodiment of the present invention. FIG. 1 shows an exterior view of seatbelt buckle 5. FIG. 2 is an internal view of seatbelt buckle 5 showing an upper portion 10 and a lower portion 15 of the magnetic switch. FIG. 3 is an internal view of seatbelt buckle 5 showing the lower portion 15 of the magnetic switch. The present embodiment comprises weight sensors in the seats of an automobile, magnetic switches in the seatbelt buckles of those seats, as shown by way of example in FIGS. 1, 2 and 3, and a top-speed limiter program that is controlled by a stock (i.e., original equipment) computer of the automobile (not shown). The stock computer controls basic engine function such as, but not limited to, ignition, turning the engine off, RPM control, and measurement of the engine's output during operation.

In the present embodiment, the top-speed limiter program operates on readings from the weight sensors and magnetic switches. If a driver or other vehicle occupant fails to use their seatbelt, the present embodiment prevents the automobile from operating faster than the desired handicapped speed (e.g., 10 mph). In alternate embodiments, the top-speed limitations can be set for various maximum speeds when lack of seatbelt usage is determined. Alternate embodiments of the present invention may utilize various means for seatbelt usage determination other than weight sensors in the seats, such as, but not limited to, breath sensors, the opening and closing of a door of the automobile, or ignition of the engine in the case of the driver's seat. Current stock computers in automobiles have an RPM limiting program that limits the engine's RPM (i.e., an RPM governor) from reaching dangerous levels. It is contemplated, that those skilled in the art will readily recognize how to configure a similar program to act as the top-speed limiter program of the present embodiment, and thereby limit car speed to a lower level when signaled to do so by the present embodiment. It is further contemplated that some alternate embodiments of the present invention may implement other means of controlling car speed, including, but not limited to fuel restriction and throttle depression restriction.

In the present embodiment the weight sensors are activated for operation upon vehicle engine ignition. When a weight sensor detects occupancy of more than a certain threshold amount (e.g., more than 10 lbs) in its respective seat, the weight sensor broadcasts a signal to the magnetic switch that is picked up by a receiver in the magnetic switch, and the magnetic switch sensory devices are activated. In alternate embodiments the weight sensors may be wired to the magnetic switches in order to activate the magnetic switches when an occupant is detected in the seat. In alternate embodiments, the magnetic switch may be activated by certain threshold weights detected by the weight sensors. In some embodiments, the magnetic switch may be configured to activate at any suitable larger weight to substantially reduce the activation of the magnetic switch by objects on the seat that do not need to be secured by the seatbelt. In the present embodiment when the magnetic switch sensory devices are activated, the magnetic switches broadcast signals to the stock computer to activate the top-speed limiter setting of the automobile's stock computer. Each magnetic switch broadcasts this signal as long as the magnetic switch detects that its respective seatbelt is not buckled. In the present embodiment, this top-speed limiter setting is ten miles-per-hour (10 mph) and remains constant until a magnetic current between upper portion 10 and lower portion 15 of the magnetic switch is established by buckling seatbelt buckle 5. The magnetic current is established when a connection is made between upper portion 10 and lower portion 15 of the magnetic switch by way of a seatbelt latch 20. Upon the buckling of seatbelt buckle 5 and the establishment of the required magnetic current, the magnetic switch transmits a signal to the stock computer that the seatbelt is fastened, and the top-speed limiter resets to an alternate maximum setting, determined by the vehicle manufacturer. In alternate embodiments the magnetic switches may communicate with the stock computer in various ways, for example, without limitation, the magnetic switches may be wired to the stock computer or communicate by any suitable wireless means including radio, infrared, ultrasound, and etc.

Some embodiments of the sensor device may be configured with sensor processing electronics to algorithmically generate the alert signal based upon a usage situation that minimize false alarms; for example, without limitation, implementing a weight threshold to ignore objects placed on the seat that are too light to be a person, which are possibly left on the seat.

In some embodiments, other alternate and suitable means known to those in the art are used instead of the magnetic switch mechanism; e.g., without limitation, electronic eyes. However, sensor approaches such electronic eyes may get dirty and affect function, whereas magnetic switches are less likely to have this problem, and are typically more robust.

Referring to FIGS. 1, 2 and 3, in typical use, a driver of an automobile with a seatbelt usage reinforcement system according to the present embodiment activates the system by starting the engine of the automobile. The top-speed limiter within the stock computer remains at a pre-set handicapped maximum speed (e.g., 10 mph) until all vehicle occupants have buckled their seatbelts. Upon the completion of seatbelt buckling, the vehicle's top-speed limiter resets to its maximum setting. Also, if at any time during the operation of the automobile any occupied seat's seatbelt becomes unbuckled, the top-speed limiter is reactivated to the pre-set handicapped maximum speed, and the automobile slows down to the pre-set handicapped maximum speed.

The present embodiment can be featured within both commercially and privately owned automobiles and can be offered as an option in a new automobile or may be added to older automobiles as an aftermarket accessory. Commercial vehicles may include, without limitation, taxicabs, buses, rental cars, semis, or delivery trucks. Some embodiments may be made in formats specifically for use in commercial vehicles, including but not limited to, semis and delivery trucks, in which only the driver's seatbelt usage would be monitored to instigate top-speed limiter activation.

Those skilled in the art, in light of the present teachings, will recognize that there are many alternatives and variations for the various elements of the present invention described above. For example, without limitation, some embodiments may be made without a weight sensor in the driver's seat, in which the occupancy of the driver's seat would be determined solely by the ignition of the engine. In some embodiments, the weight sensors may be located in the front seats only. The location of the weight sensors may be determined based on individual state laws, for example, without limitation, automobiles sold in states that do not require seatbelt usage of backseat passengers may include systems that have only front-seat weight sensors while automobiles sold in states that require all persons in the automobile to wear seatbelts would include systems with weight sensors in all of the seats.

In yet other embodiments of the present invention, instead of setting a low maximum speed, the system may prevent the automobile's transmission from entering a driving gear when a lack of seatbelt usage is determined. In other embodiments, the system may prevent the ignition of the engine until all of the seatbelts are fastened. In these embodiments the weight sensors would be activated by means other than the ignition of the engine for example, without limitation, the insertion of the key into the ignition or the opening and closing of a door of the automobile. Some embodiments may include a time delay feature in which the top-speed limit is set at the manufacturer's maximum setting for a specified time after seat occupancy is determined to allow all persons in the automobile to fasten their seatbelts before the top-speed limit is dropped to the lower limit specified by the system. This time delay would be advantageous in the case that a passenger unbuckles their seatbelt while the automobile is already in motion since the passenger would have time to refasten the seatbelt before the top-speed limit is lowered. Embodiments with a time delay feature may also include, without limitation, an alarm that would sound when a seatbelt is unfastened to alert the driver and passengers that the car will slow down if all seatbelts are not refastened.

Some embodiments of the present invention are further configured with an electronic sensor chip that is additionally adapted into the male and female end of the seat belt. This chip provides a secondary safety measure to help assure that the original male and female ends of the seatbelt are being engaged, and not some other seatbelt component used to trick the system. For example, this embodiment would prevent a person from using an old seatbelt end found at a junkyard to make the present seatbelt safety system believe the actual seatbelt of the automobile was properly engaged. Among other functions, the chip verifies that the correct male end is being inserted into the correct female end. In some implementations, the chip used for recognition of components is similar to the chips in electronic keys that prevent hot wiring, where if the vehicle does not recognize the key the car will not start.

Some embodiments may be provided with extensions for obese people. Known extensions are currently on the market and may be adapted with embodiments of present invention for proper operation therewith. As with electronic keys and remote controls for car alarm systems, any chips in the extension could be set at the dealer.

Figure 4:
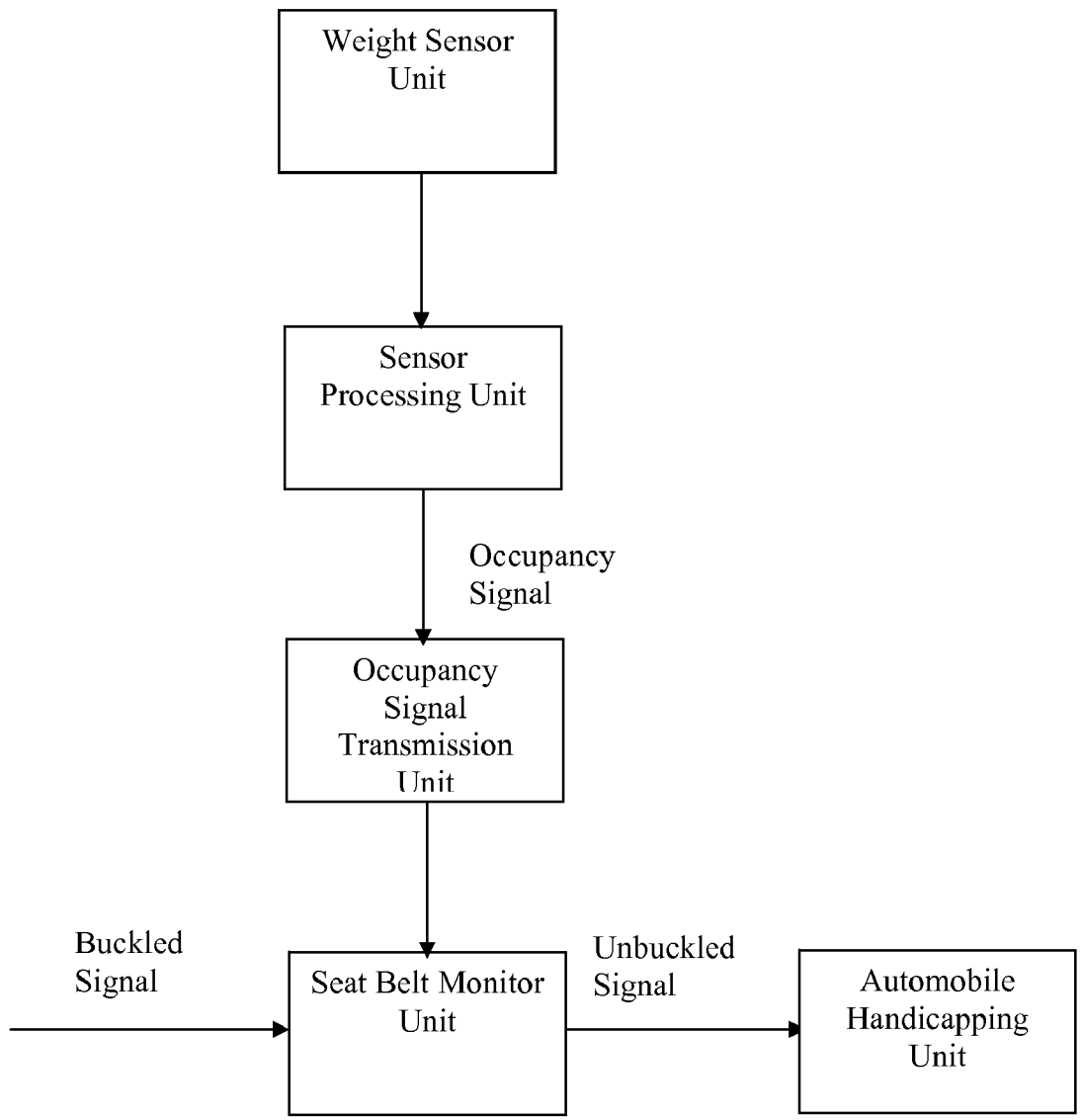
FIG. 4 is an exemplary seatbelt buckle system in accordance with an embodiment of the present invention.

A general implementation of the present invention, according to embodiment thereof, is shown in FIG. 4. The implementation includes a weight sensor unit that is used for sensing weight applied to an automobile seat and generating a corresponding weight reading when a person is secured onto the seat with the seatbelt system, and a sensor processing unit, the sensor processing unit being configured to receive the weight reading from the weight sensor and to generate an occupancy signal that indicates the seat is occupied, an occupancy signal transmission unit configured to receive the occupancy signal from the sensor processing unit and transmit the occupancy signal, a seatbelt monitor unit, the seatbelt monitor unit being configured to receive both the transmitted occupancy signal and the buckled seatbelt signal, the seatbelt monitor unit being further configured to generate an unbuckled seatbelt alarm signal based if the buckled seatbelt signal indicated the buckle is not buckled when the transmitted occupancy signal indicated the respective seat is occupied, and a automobile handicapping unit, the automobile handicapping unit being configured to receive the unbuckled seatbelt alarm signal from the seatbelt monitor unit and handicap the operation of the automobile in a predetermined way as described in the foregoing embodiments.

Although the sensor and sensor transmission units may be separate, after market devices adapted to a seat, in alternative embodiments of the present invention, one or both may, instead, be suitably manufactured/integrated into the seat and/or automobile. For example, without limitation, in alternate embodiments, the weight sensor might be built directly into the car seat with the person sitting thereupon and transmission of the occupancy signal to the seatbelt monitor may be likewise built into the car as a wired or wireless means. Furthermore, those skilled in the art, in light of the present teachings, will readily recognize a multiplicity of alternative and suitable means of communicating signals from the occupancy transmission unit to the seatbelt monitor, and, likewise, from the seatbelt monitor to the automobile handicapping unit. By way of example, and not limitation, instead of using a radio transmitter, ultrasonic or conventional infrared (IR) wireless communications systems may be implemented. In some embodiments (not shown), the weight sensor may be comprised with the sensor/transmitter system portion, instead of the sensor being separate there from.

Yet other embodiments may incorporate various known "fail-safe" mechanisms known to those skilled in the art. In such embodiments, should the fail-safe mechanism indicate that the sensors or other components of the present invention are not operating properly, the seatbelt usage reinforcement system might be disabled or otherwise handicapped to permit proper vehicle operation until repaired.

Still other embodiments of the present invention may incorporate various known tamper prevention mechanisms known to those skilled in the art. In such embodiments, should the tamper prevention mechanism indicate that the sensors or other components of the present invention have been compromised, the seatbelt reinforcement system might be automatically engaged or otherwise limit proper vehicle operation until corrected. For example, without limitation, if the sensor or communication wires of the present system are cut, the system may be configured to limit the car speed if the proper signals are not detected.

It is contemplated that the any of the foregoing embodiments may be suitably adapted by those skilled in the art as either aftermarket retrofitting kits or configured as original equipment by the automobile manufacturer. It is further contemplated that those skilled in the art, in light of the present invention, may properly adapt embodiments of the present invention to work in cooperation with other common automobile safety devices. For example, without limitation, the information provided the seatbelt usage reinforcement system of the present invention may be used to disable car use instead by an already installed breath alcohol detector system that are typically used to prevent convicted DUI (driving under the influence) drivers from using their car while intoxicated.

Having fully described at least one embodiment of the present invention, other equivalent or alternative means for implementing a system for encouraging seatbelt usage of the driver and passengers in an automobile according to the present invention will be apparent to those skilled in the art. By way of example, and not limitation, in alternative embodiments instead of the weight sensors being manufactured into the seats, weight sensors may be pads that are positioned on top of the seats. This would be beneficial for aftermarket versions because installation would be very easy. Or, for example, in alternative embodiments the connection of the seatbelt buckle may be detected by means other than a magnetic switch for example, without limitation, a mechanical switch or button. In some embodiments, the system may also include an alert upon weight sensor activation to remind users to fasten the seatbelt such as, but not limited to, an audio alert or a lighting alert. Some embodiments may use a revolutions-per-minute limiter instead of a top-speed limiter. All such alternative embodiments are contemplated as being within the scope of the present invention. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. An apparatus for reinforcing seatbelt usage in automobiles, the apparatus consisting of:
   a buckle detection switch configured into a female portion of a seatbelt buckle of seatbelt system, said buckle detection switch comprising a magnetically actuated switch and a magnet, the seatbelt system having the female buckle and male buckle portions that are operable to interlock with one another, said buckle detection switch generating and transmitting a buckled seatbelt signal in response to the magnetically actuated switch indicating the male portion is properly interlocked with the female portion and the male buckle portions is recognized as the male buckle portion originally matched to the female buckle portion, where the male buckle portion enables a magnetic current to flow between the magnetically actuated switch and the magnet for actuating the magnetically actuated switch;
   a weight sensor unit being operable for sensing weight applied to an automobile seat and generating a corresponding weight reading, said weight sensor unit, in response to the weight reading exceeding a predetermined threshold, further operable to activate said buckle detection switch for responding to the magnetically actuated switch, said weight sensor unit being activated in response to the automobile being started;
   a sensor processing unit, said sensor processing unit being configured to receive the weight reading from said weight sensor and to generate an occupancy signal that indicates the seat is occupied, said sensor processing unit being configured for algorithmically generating said occupancy signal based upon a usage situation to minimize false alarms;
   an occupancy signal transmission unit configured to receive said occupancy signal from said sensor processing unit and transmit said occupancy signal;
   a seatbelt monitor unit, said seatbelt monitor unit being configured to receive both said transmitted occupancy signal and said buckled seatbelt signal, said seatbelt monitor unit being further configured to generate and transmit an unbuckled seatbelt alarm signal indicating a presence of the occupancy signal and an absence of the buckled seatbelt signal; and
   an automobile handicapping unit, said automobile handicapping unit being configured to receive said unbuckled seatbelt alarm signal from said seatbelt monitor unit, and handicap the operation of the automobile in a predetermined way when said unbuckled seatbelt alarm signal is received, said automobile handicapping unit having a timer function where when the automobile is being operated un-handicapped and said unbuckled seatbelt alarm is received, said timer function inhibits said handicapping for a predetermined amount of time sufficient to alert an occupant that the buckle is unbuckled and allow the occupant to buckle the seatbelt, said automobile handicapping unit further being configured with a function for inhibiting said handicapping in an event of component failure of the apparatus or tampering of the apparatus.

2. The apparatus of claim 1, in which said weight sensor unit is a weight-sensor pad configured into padding of the seat where the person sits upon.

3. The apparatus of claim 1, in which said weight reading is a binary signal indicating the presence or not of a certain amount of weight on the seat.

4. The apparatus of claim 1, in which said weight reading is an analog signal and said sensor processing unit comprises electronics to threshold the analog signal to thereby generate a binary occupancy signal that indicates the presence or not of a certain amount of weight on the seat.

5. The apparatus of claim 1, in which said occupancy signal transmission unit is a wireless transmitter system comprised of a radio transmitter and an antenna, and in which said seatbelt monitor unit comprise a corresponding radio receiver configured to properly receive and decode the wirelessly transmitted occupancy signal.

6. The apparatus of claim 1, in which said occupancy signal transmission unit is a wireless transmitter system comprised of an infrared (IR) transmitter, and in which said seatbelt monitor unit comprises a corresponding IR receiver configured to properly receive and decode the wirelessly transmitted occupancy signal.

7. The apparatus of claim 1, in which said occupancy signal transmission unit is a wired transmitter system, and in which said seatbelt monitor unit comprise a corresponding wired receiver configured to properly receive and decode the transmitted occupancy signal.

8. The apparatus of claim 1, in which said buckle detection switch comprises first and second portions that are disposed such that the male buckle portion moves in between the two when the male and female buckle portions are interlocked with one another, said first buckle detection switch portion comprising the magnetically actuated switch, and said second buckle detection switch portion comprising the magnet.

9. The apparatus of claim 1, in which said seatbelt monitor unit comprises a wired and/or wireless transmitter system to transmit said generated unbuckled seatbelt alarm signal, and in which said automobile handicapping unit comprise a corresponding wired receiver configured to properly receive and decode the transmitted unbuckled seatbelt alarm signal.

10. The apparatus of claim 1, in which said automobile handicapping unit is a program executing on a stock automobile computer that is operable for handicapping the automobile.

11. The apparatus of claim 1, in which said predetermined way of handicapping the automobile is by way of limiting the speed of the automobile to a predetermined value.

12. The apparatus of claim 1, in which said predetermined way of handicapping the automobile is by way of preventing the ignition of the automobile.

13. An apparatus for reinforcing seatbelt usage in automobiles having a seatbelt system with female and male buckle portions that are operable to interlock with one another, the apparatus consisting of:

means for generating a buckled seatbelt signal by sensing a magnetic current enabled by the male portion properly interlocked with the female portion and recognizing the male portion as originally matched to the female portion;

means for sensing weight applied to an automobile seat and generating a corresponding weight reading, said sensing means, in response to the weight reading exceeding a predetermined threshold, operable for activating said generating means for sensing the magnetic current;

sensor processing means for receiving the weight reading from said sensing means, generating an occupancy signal that indicates the seat is occupied and minimizing false alarms;

occupancy signal transmission means for receiving said occupancy signal from said sensor processing means and transmitting said occupancy signal;

seatbelt monitoring means for receiving both said transmitted occupancy and buckled seatbelt signals, and generating and transmitting an unbuckled seatbelt alarm signal indicating a presence of said transmitted occupancy signal and an absence of said buckled seatbelt signal; and means for receiving said unbuckled seatbelt alarm signal from said seatbelt monitoring means, handicapping the operation of the automobile in a predetermined way and inhibiting said handicapping in an event of failure or tampering.

14. A method for reinforcing seatbelt usage in automobiles having a seatbelt system with female and male buckle portions that are operable to interlock with one another, the method consisting of:

Steps for configuring a program executing on a stock automobile computer that is operable for handicapping the automobile and inhibiting said handicapping;

Steps for detecting the female and male buckle portions are interlocked by sensing a magnetic current enabled by the male buckle portion and by recognizing the male portion as originally matched to the female portion, and for generating buckled seatbelt signals in response to successful detecting and recognizing;

Steps for sensing weight applied to an automobile seat and generating a corresponding weight reading, said sensing steps initiating said detecting steps;

Steps for indicating the presence or not of a certain amount of weight on the seat;

Steps for receiving the weight reading, generating an occupancy signal that indicates the seat is occupied and minimizing false alarms;

Steps for receiving said occupancy signal and transmitting said occupancy signal;

Steps for receiving both said transmitted occupancy and buckled seatbelt signals, and generating and transmitting an unbuckled seatbelt alarm signal indicating a presence of said transmitted occupancy signal and an absence of said buckled seatbelt signal; and Steps for receiving said unbuckled seatbelt alarm signal, handicapping the operation of the automobile in a predetermined way and inhibiting said handicapping in an event of failure or tampering.

\* \* \* \* \*